H. C. FORD.
RANGE KEEPER.
APPLICATION FILED DEC. 4, 1917.

1,370,204.

Patented Mar. 1, 1921.
6 SHEETS—SHEET 1.

Fig. 1.

WITNESSES:
Geo. C. Cheney

INVENTOR.
Hannibal C. Ford
BY
Rosenbaum, Stockbridge & Root
ATTORNEYS

H. C. FORD.
RANGE KEEPER.
APPLICATION FILED DEC. 4, 1917.

1,370,204.

Patented Mar. 1, 1921.
6 SHEETS—SHEET 4.

WITNESSES:
Geo. E. Cheney

INVENTOR
Hannibal C. Ford
BY
Rosenbaum, Stockbridge & Borst
ATTORNEYS

H. C. FORD.
RANGE KEEPER.
APPLICATION FILED DEC. 4, 1917.

1,370,204.

Patented Mar. 1, 1921.
6 SHEETS—SHEET 5.

WITNESSES:

INVENTOR.
Hannibal C. Ford
BY
Rosenbaum, Stockman & Borst
ATTORNEYS

H. C. FORD.
RANGE KEEPER.
APPLICATION FILED DEC. 4, 1917.

1,370,204.

Patented Mar. 1, 1921.
6 SHEETS—SHEET 6.

UNITED STATES PATENT OFFICE.

HANNIBAL C. FORD, OF NEW YORK, N. Y., ASSIGNOR TO FORD INSTRUMENT COMPANY, INC., A CORPORATION OF NEW YORK.

RANGE-KEEPER.

1,370,204.   Specification of Letters Patent.   Patented Mar. 1, 1921.

Application filed December 4, 1917. Serial No. 205,357.

*To all whom it may concern:*

Be it known that I, HANNIBAL C. FORD, a citizen of the United States, residing at the city of New York, in the borough of Queens and State of New York, have invented certain new and useful Improvements in Range-Keepers, of which the following is a full, clear, and exact description.

This invention relates to range keepers and more particularly to an instrument for furnishing continuous indications of the range rate and the deflection rate, and also for generating the range.

One of the objects of the invention is to provide an instrument of this character by means of which the vectors corresponding to the course and speed of two moving bodies, such as a "ship" and a "target," may be set up upon the instrument independently of each other and resolved into components along the line of sight and the line normal to the line of sight; the components along the line of sight are added together to give the rate of change of range, and the components along the line normal to the line of sight are added together to give the deflection rate.

Another object of the invention is to provide an instrument of the character referred to in which the true courses of the "ship" and "target" are indicated by pointers representing the "ship" and "target" respectively, which are also disposed to represent the relative positions of the "ship" and "target" whereby the operator of the instrument has always before him a true graphic picture of the two moving ships and may at all times obtain direct readings of the true and relative courses of both ships.

A further object of the invention is to provide an instrument, in which the entire casing of the instrument is revoluble and is provided with a sight vane, which instrument is so constructed that, if the sight vane is kept trained upon the "target" and if the correct courses and speeds of the two ships are set up, it will continue to automatically indicate the correct rate of change of range and deflection and continuously generate the range.

A further object of the invention is to provide an improved form of integrating device for generating the range from the range rate.

Further objects of the invention are to provide an instrument which is compact with the parts so designed that irrespective of the position of the two "ships" and their respective speeds, the instrument will at all times give true and accurate readings.

Still other objects of the invention will be apparent from the detailed description hereinafter to follow, when taken in conjunction with the accompanying drawings, the invention consisting of the combinations and constructions which will be described and set forth particularly in the appended claims.

Figure 10:
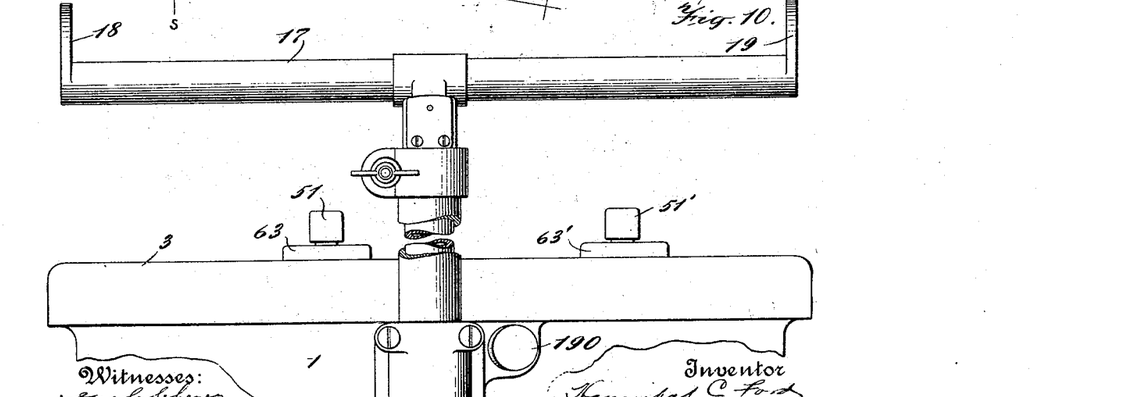
Fig. 10 is an elevation of the entire instrument.

In the specific embodiment of the invention shown, the entire instrument is disposed within a casing 1 having a glass cover plate 2 held in place by a bezel 3. The casing 1 is supported upon a pedestal or stand 4 which is adapted to be secured to the deck of the ship. The casing has a boss 5 through which a shaft 6 passes, which shaft is provided with a head 7 having an annular slot or recess 8 therein. The head 7 fits into the upper end of the pedestal 4 and set screws 9 engaging in the recess 8 secure the shaft to the pedestal. The casing 1 is rotated upon the shaft 6 by means of a handwheel 10. This wheel is mounted upon a shaft 11 carrying at its inner end a worm 12, the shaft 11 being suitably supported in a bearing 13 formed upon the bottom of the casing. The worm 12 meshes with a worm wheel 14 which meshes with a large gear 15 secured to the stationary shaft or axle 6 whereby when the handwheel 10 is turned, the worm 12 will move around the gear 15 and carry the case with it. The casing carries a sight vane 17 (Fig. 10) mounted upon a post extending vertically upwardly from the side wall of the casing, which consists of a fore-sight 18 and a back sight 19. This sight vane is kept trained upon the "target" by rotating the handwheel 10 as described.

Figure 1:
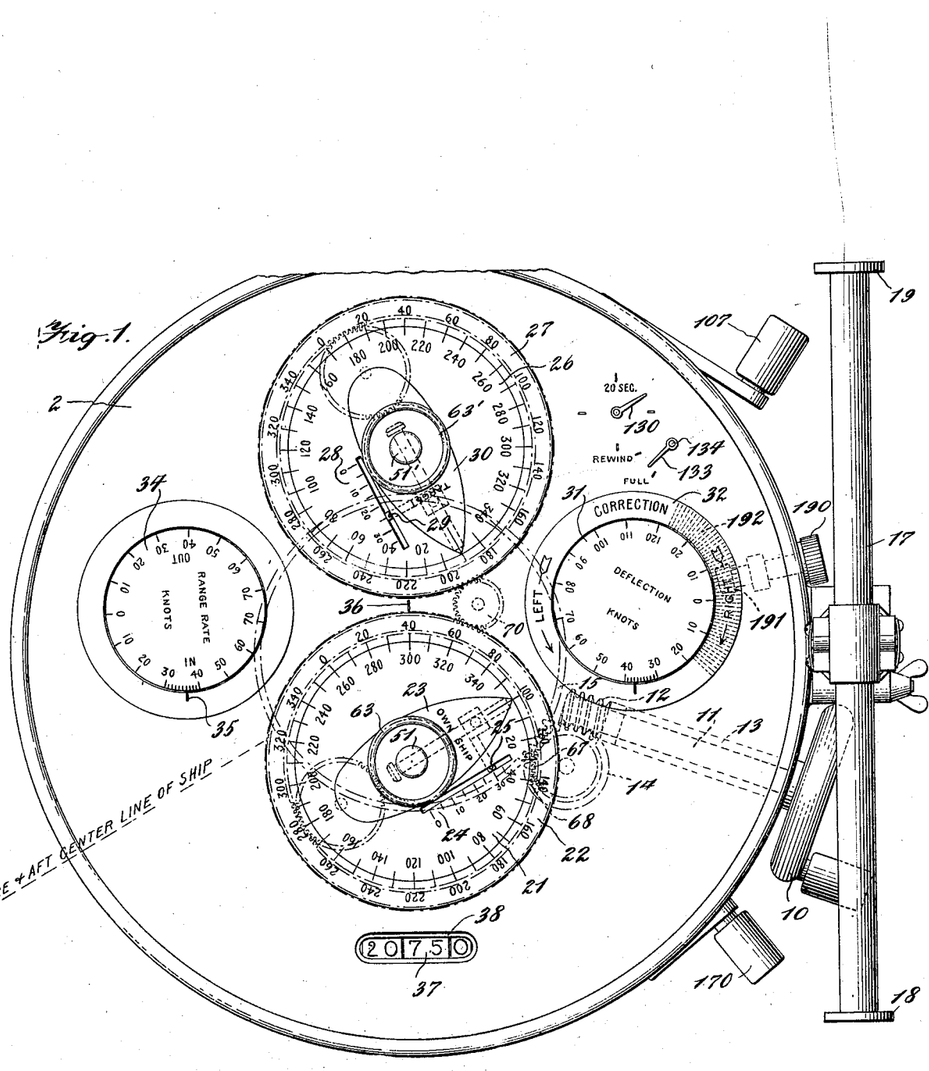
Figure 1 is a plan of the instrument showing the dials and also portions of the connecting gearing.

The face plate of the instrument is indicated 20, which face plate carries a "ship" dial 21 and a "ship" compass or course ring 22, which parts may be rotated separately or together. Marked upon the "ship" dial 21 is a pointer representing the "ship" which is indicated 23. The "ship" dial is also provided with a speed scale 24 and a movable pointer 25 coöperating therewith. The "target" dial is indicated 26, which dial is also surrounded by a compass ring 27, the dial being provided with a speed scale 28 and a movable speed pointer 29. A pointer 30 represents the "target." The dial 26 and compass ring 27 are independently rotatable or can be rotated together, as will be further described. The face plate 20 also carries a deflection dial 31 which is surrounded by a movable correction ring 32. The face plate is also provided with a dial indicating the rate of change of range or the range rate which is indicated 34, this dial being read from a fixed point as at 35. A lubber's line 36 which is parallel to the sight vane 17 indicates the line of sight or fire between the "ship" and "target." The range is read from a range counter 37, the numbers appearing through an opening 38 in the face plate.

Figure 11:
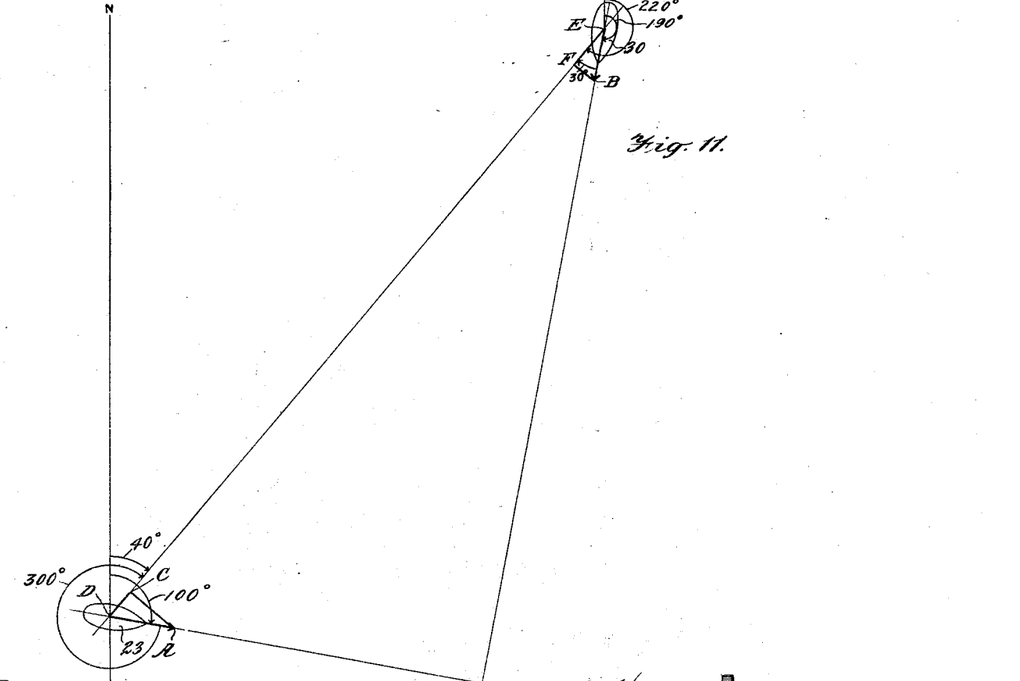
Fig. 11 is a vector diagram showing two ships in the positions set up upon the instrument in Fig. 1.

To clearly understand the construction of the instrument and the mechanism utilized for correctly actuating the dials described, reference may be had to Fig. 11 of the drawings. In this view a vector diagram is shown in which the position of two ships corresponds to the readings set up upon the instrument in Fig. 1, and it is believed that from this specific example the theory of operation of the machine under all conditions will be apparent. The dials all read azimuths and the true course of the "ship" is readable upon the compass ring 22 by means of the "ship" pointer 23 which shows the true course of the "ship" to be 100°. In the same way the true course of the "target" is readable upon the compass ring 27 in connection with the "target" pointer 30 and is 190°. The true bearing of the "ship" with respect to the "target" is read from the compass ring 22 by means of the lubber's line 36, and is 40°. The true bearing of the "ship" from the "target" is also indicated by the lubber's line 36 upon the compass ring 27 which is 220°. The relative bearing of the target from the "ship," i. e., the bearing of the "target" from the bow of the "ship," is read by means of the lubber's line upon the scale of the "ship" dial 21 which is 300°. The relative bearing of the "ship" from the "target" is also read by the lubber's line 36 upon the "target" dial 26 which is 30°. The speed of the "ship" is read by means of a movable pointer 25 upon the speed scale 24 which is thirty knots. The speed of the target is read from the speed scale 28 by means of the movable pointer 29 and is 25 knots. Taking these factors and plotting them in a diagrammatic vector diagram, the results are as shown in Fig. 11 where the vector DA represents a vector showing the course and speed of the "ship" and the vector EB represents the course and speed of the "target," the line DE representing the line of sight or fire. As is well understood the sum of the components of the vectors DA and EB along the line of sight give the rate of change of range; i. e., the sum of the vectors DC and EF. As is also well understood, the sum of the components of the vectors DA and EB along the line normal to the line of sight will give the deflection rate, or in other words, the sum of the vectors CA and FB. It will also be apparent from this diagram that if the "ship" pointer 23 remains parallel to the fore and aft center line of the "ship" upon which the instrument is mounted, the true course of the "ship" may be read from the compass ring 22 if the zero point upon this ring is maintained due north, which may be accomplished manually each time the course of the vessel is changed. It will also be apparent that the true course of the "target" may also be set up upon the compass ring 27 if this compass ring is also kept with its zero point due north. For this reason the two compass rings are connected to be moved together when the course of the "ship" is changed. Furthermore, it is obvious that if the lubber's line 36 represents a line of sight, the relative positions of the pointers representing the "ship" and "target" with respect to the lubber's line, will correspond identically with the relative positions of the vectors to the line of sight as shown in Fig. 11.

Assuming now that two ships represented in the vector diagram continue along their courses at respective speeds, it is obvious that the line of sight DE will swing to the left. This will cause the components which determine the range rate and the deflection rate to vary. Component DC of the range rate will gradually decrease while the component EF will gradually become larger, and the component CA of the deflection rate will become larger while the component FB will become smaller. It will also be obvious that it is the angular position of the line of sight or fire which determines the variation in the components, since the vectors from the line of sight remain parallel in their successive positions. These same conditions can be set up in an instrument by providing a fixed line corresponding or parallel to the line of sight, and mechanical devices or vectors for laying off from the fixed line the two vectors which correspond to the courses and speeds of the two ships; the mechanical vectors and fixed line must, however, be capable of relative rotation to cause the vectors to assume their proper angular positions with respect to the line of sight. In the specific embodiment of the invention shown, this relative rotation of the parts is obtained by swinging the fixed line to a position parallel to the line of sight. The mechanical vectors are then carried bodily with the fixed line but are moved so that their successive positions are parallel unless manually reset.

These mechanical devices or vectors are provided in the present instrument by two rotatable screws each carrying a traveling nut or block. The position of the blocks determine the length of the vectors, the axes of the screws determine the direction of the vectors, and at zero speeds the blocks are centered over the fixed line in the instrument. The specific construction of the instrument, whereby these blocks and screws can be moved to provide a mechanical vector for any course and speed of the "ship" and "target" and axes of the screws maintained in successive parallel positions when the casing and the line of sight are angularly displaced, will now be described.

The face plate of the instrument, which has been designated 20, consists of a circular plate or disk which fits into the upper end of the casing 1 and rests upon a shoulder. This disk is provided with two circular openings. The "ship" dial 21 and its compass ring 22 is mounted in one of these openings upon ball bearings 40 and the target dial 26 and its compass ring 27 is mounted in the other of these openings upon ball bearings 41. The "ship" dial and its compass ring and "target" dial and its compass ring are both of the same construction, the "ship" dial being clearly disclosed in detail in Figs. 6 and 8. As will be clear from these figures, the dial 21, which is circular in shape, is provided with a shoulder 42 engaging a corresponding shoulder upon the compass ring 22 for supporting the dial within the compass ring, but permitting relative rotation of the dial. The compass ring 22 has secured to its under face an annular rack 43 having both internal and external teeth. The under face of the dial 21 is slotted, and mounted within this slot is a threaded screw 44 whose axis coincides with the axis of the "ship" pointer 23. One end of this screw is supported in a bearing 45 secured to a bracket 46 fastened to the underside of the dial (see Fig. 2). The end of the threaded shaft or screw 44 adjacent the bracket 46 is of reduced diameter and carries a collar which is secured to it on the end projecting through the bracket 45 for preventing linear displacement of this part. The threaded shaft 44' is of similar construction and also carries a nut 44$^a$ on its end for the same purpose, which nut is designated 44$^b$. Mounted upon the screw 44 is a traveling block or nut 47 (Figs. 6 and 8) which is grooved to slide in the slideways 48$^a$. The nut 47 therefore serves as the support for the other end of the threaded shaft or screw 44. The threaded shaft 44 extends inwardly beyond the center of the dial and carries a beveled gear 48 which is actuated by a gear 49 mounted upon a hollow shaft 50, provided with a knurled head 51. Telescopically fitted within the hollow shaft 50 is a post 52 which is provided with a head 53 secured in a circular recess 54 in the bottom face of the dial. A spring 55 also within the hollow shaft 50 engages the post 52 and the end of the recess in the shaft 50 to press the latter upwardly so as to normally hold the gear 49 out of mesh with the beveled gear 48. Secured to the block 47 is an arm 56, which arm projects through a slot 57 in the dial and carries the movable pointer 25, which coöperates with the speed scale 24. It will thus be seen that by pushing the head 51 downwardly and rotating the same, the block 47 will be displaced linearly along the screw 44 until the pointer 25 is opposite the mark upon the speed scale corresponding to the speed of the "ship" or "target."

Figure 8:
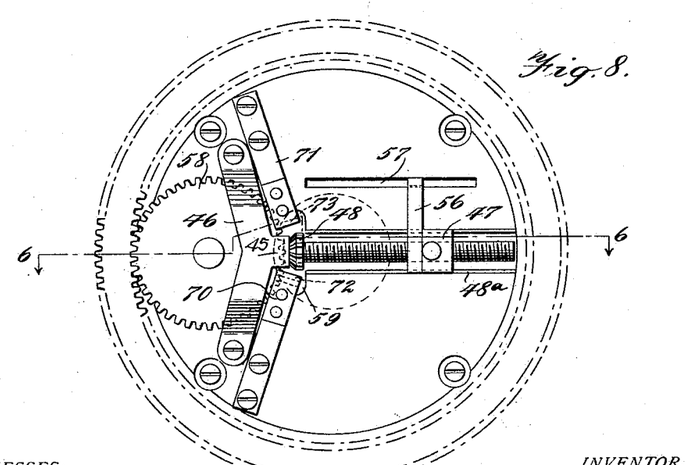
Fig. 8 is a bottom plan view of Fig. 6.

Mounted upon a pin 57' and fitting in a recess in the under face of the dial is an angularly disposed gear wheel 58 which meshes with the internal teeth upon the annular rack or ring 43. The diametrically opposite portion of the gear wheel 58 projects into an opening 59 in the dial and it may here be stated that the beveled gear 48 also projects into this opening to permit the engagement of its teeth by the gear 49. Surrounding the shaft 50 is a sleeve 60 which carries at its lower end a gear wheel 61 which is adapted to mesh with the teeth of the gear 58 to rotate the same. The upper end of the sleeve 60 carries a hub or knob 63 by which the sleeve is rotated, it being understood that this sleeve is rotatable independently of the shaft 50. The gear wheel 61 is hollow and the shaft 50 is provided with a flange 64 which engages the internal portion of the gear wheel so that the tension of the spring 55 will normally hold the gear wheel 61 as well as the gear wheel 49 out of engagement with their respective parts. When, however, the knob 63 is pressed downwardly the gear wheel 49 will also be pressed downwardly but the independent rotation of the sleeve 60 will cause the gear wheel 58 to be rotated without causing the rotation of the threaded shaft 44 through the gears 49 and 48. As is evident from Fig. 6, the head 51 and hub 63, as well as a portion of their shafts, are disposed exteriorly of the glass cover plate 2, the cover plate being provided with a suitable opening through which the shaft 50 and sleeve 60 pass, the sleeve being surrounded by a bushing 65 secured to the cover plate. The target dial and its surrounding compass ring are of the same construction, the annular rack being designated 43', the screw 44', the block 47', the angularly disposed gear 58', etc.

As has been described, the rotation of the gear wheel 14 by means of the hand wheel 10 causes the casing to rotate around the central gear 15. The gear 14 is also connected by means of a shaft 66 (Fig. 2) to a gear 67 positioned just below and to one side of the "ship" dial. This gear meshes with an annular rack or toothed ring 68 secured to the "ship" dial by means of pins 69. The ratio of gears 67 and 68 is the same as the ratio of gears 14 and 15, for which reason as the casing is revolved by means of the hand wheel 10 the gears 67 and 68 will rotate the dial and cause the axis of the screw 44 and the ship pointer 23 to assume successive parallel positions.

The annular racks 43 and 43' are connected together by means of a pinion 70 which is mounted upon a pin secured to the under side of the face plate 20. The gear wheel 58 is normally locked in position by springs 70 and 71 which have upturned ends 72 and 73, one of which ends fits between two of the teeth of the gear wheel when the other end is resting upon a gear tooth so that the springs will alternately lock the gear in position. Similar springs lock the gear wheel 58' in the same manner. These springs are forced out of locking engagement with the gear wheel by the heel of the gear wheel 61 when the latter is pushed downwardly by the knob 63. The gear wheels 58 and 58' therefore normally lock the compass rings 27 and 22 to their respective dials so that when the gear 67 is rotating the dial 21 and its ring 22, the pinion 70 will cause the rotation of compass ring 27 and dial 26 a corresponding amount to hold the axis of the screw 44' or the axis of the target pointer 30 in successive parallel positions.

The axis of the screw 44 and "ship" pointer 23 are set and remain parallel at all times to the fore and aft center line of the boat, as will be later described, and the course of the boat is set up with respect to this pointer by moving the compass ring 22 so that the zero point upon this dial will always remain due north. This is accomplished in the construction described, by pressing down the knob 63, which, and since the "ship" dial 21 is held fixed, through the gears 68, 67, 66 and 14, the rotation of the gear 58 will rotate the annular rack 43 relative to the dial. In practice this ring is rotated each time the course of the "ship" changes to maintain the zero point of the ring due north; or in other words, to set up the course of the "ship" upon the instrument, the knob 63 is depressed and rotated until the degree opposite the pointer 23 corresponds to the course of the "ship", which, in the example shown, is 100°.

The rotation of the compass ring 22 will also, through the pinion 70, rotate the compass ring 27 a corresponding amount so that the two compass rings will always be in parallelism, that is, with the zero point of each pointing due north. The true course of the "target" is set up relative to the compass ring 27 by depressing and rotating the knob 63' since it is obvious that when this knob is depressed and rotated the gear 58' will cause the dial 26 to be rotated, since the rack 43' is held against rotation by means of the pinion 70, rack 43, etc. The blocks 47 and 47' are moved to a position corresponding to the speed of the "ship" and "target" by depressing the knobs 51 and 51' as described.

It will be evident that the angular positions of the screws 44 and 44' and the linear positions of the blocks 47 and 47' define the vectors drawn from the center of each of the "target" dials, and that the center of the dials lie on the fixed line parallel to the line of sight. These mechanical vectors correspond, therefore, to the vectors disclosed in the diagram shown in Fig. 11. It will also be evident that if some means is provided for resolving these vectors into components parallel to the line of sight and to a line normal to the line of sight that the range and deflection rates may be obtained. This is accomplished by means of slides, most clearly disclosed in Fig. 3 of the drawing. The blocks 47 and 47' have extending downwardly therefrom pins 72 and 72'. The pin 72 engages in a slot in an arm 73 in a slide 74, which is parallel to the line of sight. This pin also engages in a slot in an arm 75 in a slide 76 which is at right angles to the slide 74, the slides being maintained in position by rollers 77, which permits them to slide back and forth freely. In the same manner the pin 72' engages in a slot in an arm 73' in a slide 74' and also in a slot in an arm 75' in a slide 76', the slides 74 and 74' being parallel to each other, as are also the slides 76 and 76'.

Figure 3:
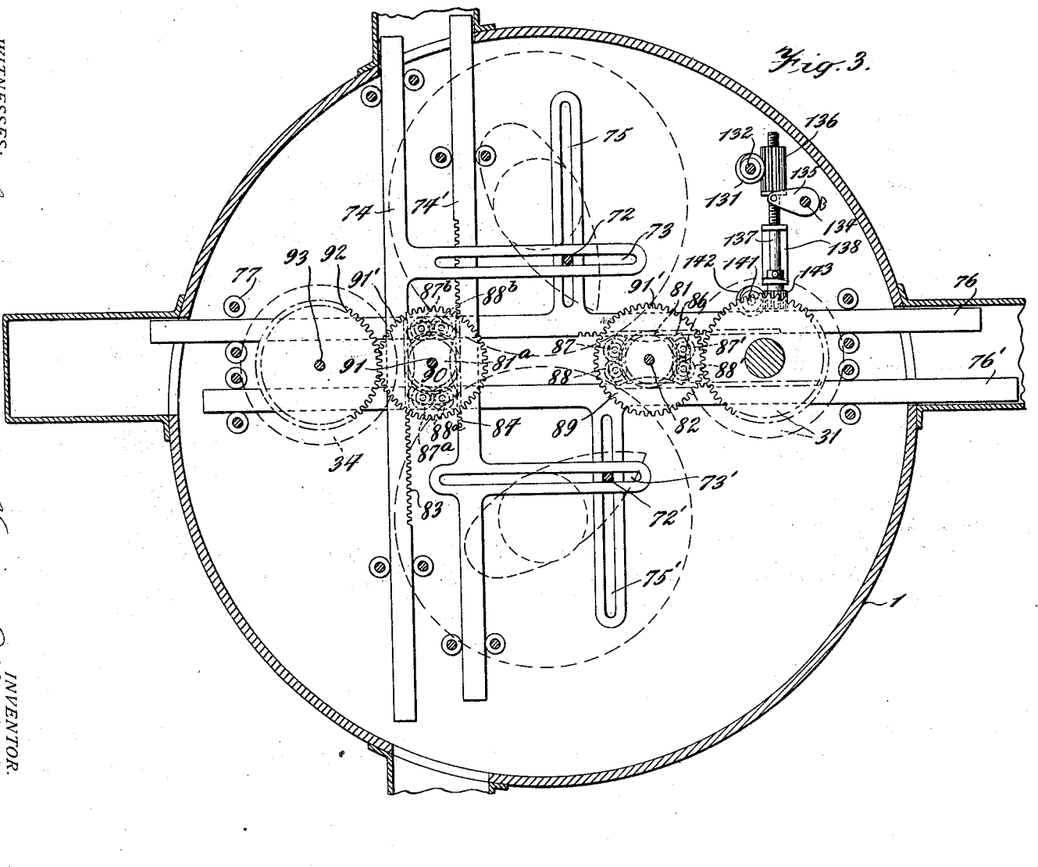
Fig. 3 is a horizontal section upon the line 2—2 of Fig. 2, looking in the direction of the arrows.

As the casing is revolved to keep the sight vane trained upon the target, these mechanical vectors are moved to successive parallel positions, and the pins 72 and 72' will cause the slides 74 and 74', 76 and 76' to move backward and forward. The combined displacements of the slides 76 and 76', which are normal to the line of sight, determine the deflection rate. These displacements are added together by means of differential gearing. Gears 80 and 81 are mounted loosely upon a shaft 82, the gear 80 meshing with a rack 83 formed upon the slide 76 and the gear 81 meshing with a rack 84 formed upon the slide 76'. Mounted intermediate these gears is a spider 86 which is fastened to the shaft 82. This spider carries two sets of pinions, the pinions of one set being designated 87 and 88. The pinion 87 meshes with the gear 81 while the pinion 88 meshes with the gear 80. The other set of pinions is designated 87', 88', and are disposed at diametrically opposite points to the pinions 87 and 88, meshing with the pinions 80 and 81, in the same manner. By the use of this differential it is evident that the displacements of the two slides 76 and 76' are added together and the rotary displacement of the shaft 82 is the equivalent of the algebraic addition of the two components of the vectors along a line normal to the line of sight. The angular displacement of the shaft 82 is therefore proportional to the deflection rate and drives the deflection rate dial through a gear 89 carried by the shaft 82, which gear meshes with a gear on the shaft of the deflection rate dial 31.

The movement of the slides 74 and 74' are also added together by a differential 90 having pinions 87$^a$, 88$^a$, 87$^b$, 88$^b$, of a similar construction to the one just described, which differential is driven by racks upon the slides in the same manner. The shaft 91 of the differential carries a gear wheel 91' meshing with a gear wheel 92 upon a shaft 93 which supports the range rate dial 34.

Figure 4:
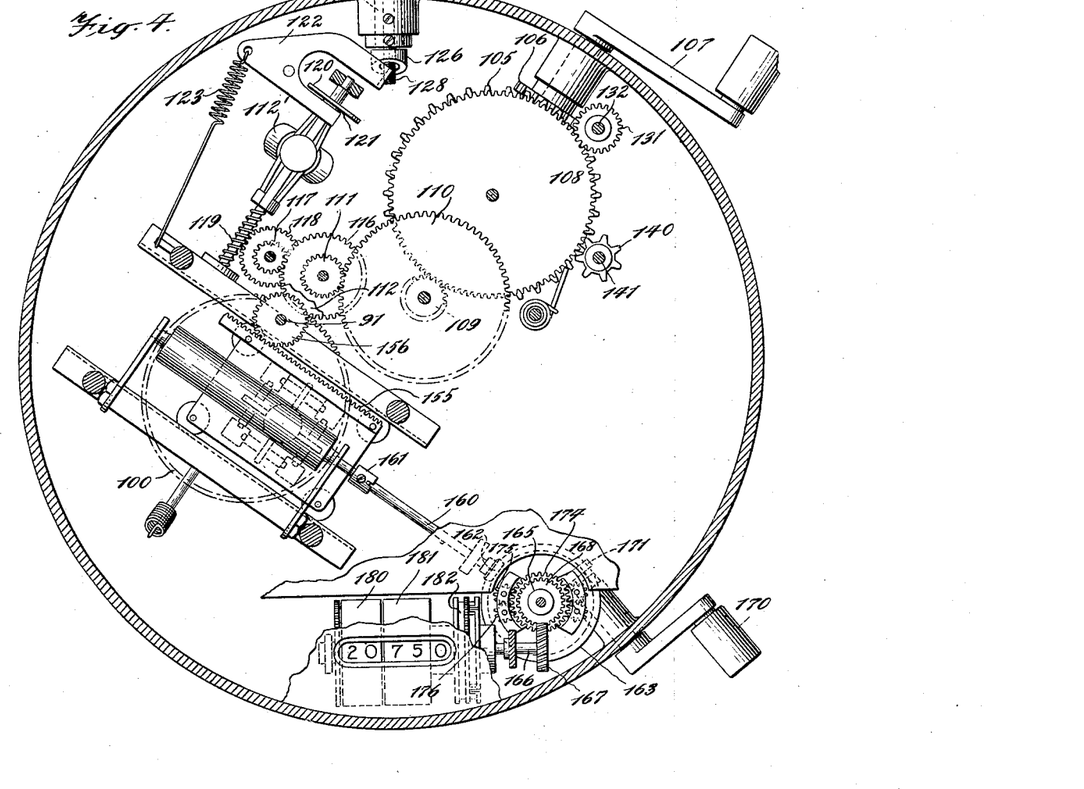
Fig. 4 is a similar section taken on the line 4—4 of Fig. 2.
Figure 5:
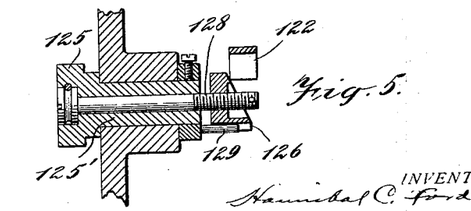
Fig. 5 is a detail of the controlling mechanism for the spring motor.

The angular movement of the shaft 91 is proportional to the range rate. This shaft is therefore also utilized for generating the range, the integrator by which this is accomplished being clearly shown in Fig. 4. This integrator consists of a variable speed mechanism having a driving element rotatable at a constant speed and a driven element whose speed is varied in accordance with the range rate, or in accordance with the angular movement of the shaft 91. The variable speed mechanism is of the ball and disk type and comprises a disk 100 which is mounted upon a frame piece 101 on a post 102. Preferably, to rigidly support the disk, ball bearings 103 support the disk upon the frame. This disk is driven from a spring motor 104 having a spring drum carrying a gear 105 which meshes with a gear 106 rotated through a crank 107 extending exteriorly of the casing. The spring motor 104 is also provided with a driving gear 108 and is connected to the disk 100 through reduction gearing consisting of gears 109, 110, 111 and 112. The spring motor is regulated through a governor 112' which is connected to the driving gear 108 of the motor through gears 108, 109, 110, 111, 116, 117 and worm gear 118, gear 118 driving a worm 119 upon whose shaft the spring governor 112 is mounted. This governor may be of the usual type utilized for phonographs and for like purposes, the shaft of the governor being provided with a disk 120 which engages with a friction disk 121 mounted upon a bell crank 122, the friction between the disk 120 and 121 regulating the speed of the motor. The bell crank 122 is normally urged by a spring 123 to press the disk 121 against the rotatable disk 120 and to thereby prevent the operation of the spring motor. The motor is started by means of a knob 125 (Fig. 5) upon a shaft 125' which carries at its inner end a cam 126 which is adapted to engage the bell crank 122 when the knob 125 is rotated to thereby force the bell crank inwardly against the tension of the spring 123 and permit the motor to operate. As will be evident, the distance which the disk 121 is moved inwardly determines the speed of the motor, since the ball governor 112 will rapidly, by centrifugal force, cause the rotatable friction disk 120 to move along its supporting shaft until it engages the friction disk 121, and the motor will then be braked in the usual manner. To regulate the speed of the spring motor the cam 126 is mounted upon a screw 128 which passes through the shaft 125'. A pin 129 secured to the shaft 125' prevents relative rotation of the cam and shaft so that if the screw 128 is turned the cam 126 is moved forward or backward, thus increasing or decreasing the throw of the bell crank 122 to thereby adjust the speed of the disk of the variable speed transmission.

In the specific embodiment of the machine the motor is regulated and adjusted so that the pointer 130 (see Fig. 1) makes one revolution in twenty seconds. The pointer 130 is driven from the driving gear 108 of the motor by means of a pinion 131 secured to a shaft 132 upon which the pointer 130 is mounted.

To determine when the spring motor needs rewinding, a pointer 133 is utilized (see Fig. 1) which pointer coöperates with the words "Rewind" and "Full" upon the face plate, the distance from the pointer to these two marks adjacent these two words showing the condition of the spring. The pointer 133 is mounted upon a shaft 134 which shaft carries an arm 135 which presses against a gear 136 threaded upon a shaft 137 which is mounted in a bracket 138. When the motor is unwinding, the gear 136 is driven by means of a worm 131' mounted upon the shaft 132 so that as the gear 136 rotates, it travels along the shaft 137 and moves the pointer 133 toward its "rewind" position. When, however, the motor is being rewound by means of the crank 107 the gear 136 is held against rotation by the worm 131' and the shaft 137 is rotated in the opposite direction to cause the gear 136 to travel along the shaft 137 until the pointer again assumes its position indicating that the motor is fully wound. The shaft 137 is driven by means of a pinion 140 which meshes with the gear 105 by which the motor is wound, the pinion 140 being carried by a shaft 141 upon which is mounted a worm 142 which engages a gear 143 mounted upon the shaft 137.

Figures 6, 7:
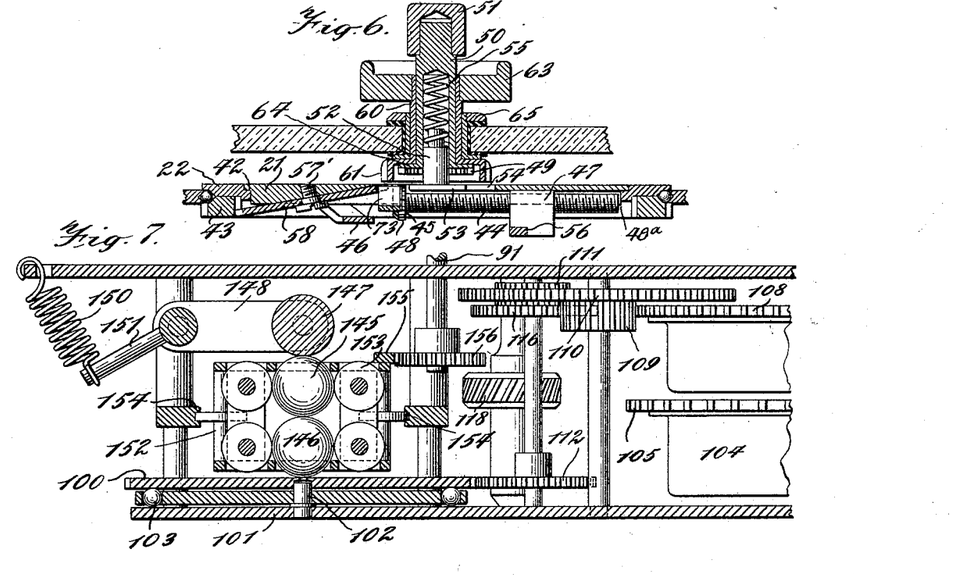
Fig. 6 is a central section through the ship dial and associated parts.
Fig. 7 is a vertical section showing the integrator and its connection to the spring motor.

By means of the spring motor described, the disk 100 may be driven at a constant speed, and the other portions of the variable speed mechanism coöperating with this disk will now be described. In its preferred form the movable part of the variable speed mechanism comprises two steel balls 145 and 146, one of which balls, namely, 146, is in rolling contact with the disk 100, the other ball 145 is in rolling contact with a cylindrical roller 147 while the two balls are in rolling contact with each other. The cylindrical roller 147 is mounted in a yoke 148 and pressure is imparted upon this roller to maintain the parts in rolling contact by means of a spring 150, the yoke 148 being pivoted and the tension of the spring 150 being exerted thereon through the arm 151. The balls 145 and 146 are surrounded by a cage 152 which is provided with rollers 153 which engage the balls and hold them so that the points of rolling contact between themselves and the disk and roller, respectively, are in alinement. This cage 152 is mounted in slideways 154 so that the cage may slide freely to cause the balls to travel radially across the disk. This movement of the cage is accomplished by means of a rack 155 which meshes with gear 156 carried by the shaft 91 which, as has been described, has a movement proportional to the range rate and hence the linear movement of the cage and balls across the disk will also be proportional to the range rate. The variable speed mechanism described will, therefore, integrate the range rate and the roller 147 may be utilized to drive a range counter. This is accomplished by means of a shaft 160 which is flexibly connected to the roller 147 at 161, which shaft carries a beveled gear 162 meshing with a gear 163, which gear carries a spider 164 mounted upon a shaft 165. The shaft of the range counter is designated 166 and carries a spiral gear 167 adapted to mesh with a spiral gear 168 carried by the shaft 165. The shaft 165 is also adapted to be driven by a crank 170, which crank carries a gear 171 which meshes with the spiral gear 172. The shaft 173 upon which the spiral gear 172 is mounted, carries a gear 174 which meshes with a pinion 176 carried by the spider 164. The pinion 176 in turn meshes with a pinion 175 which meshes with a gear 177 carried by the shaft 165, the gears 174, 175, 176 and 177 constituting a differential whereby the shaft 166 of the range counter may be driven by the bevel gear 163 or by the spiral gear 172 either simultaneously or separately.

The shaft 166 actuates two movable counter drums 180 and 181 of the range counter through a transfer mechanism 182 which is of the usual construction and is so constructed that one revolution of the drum 181 will advance the drum 180 a partial revolution.

Figures 2, 9:
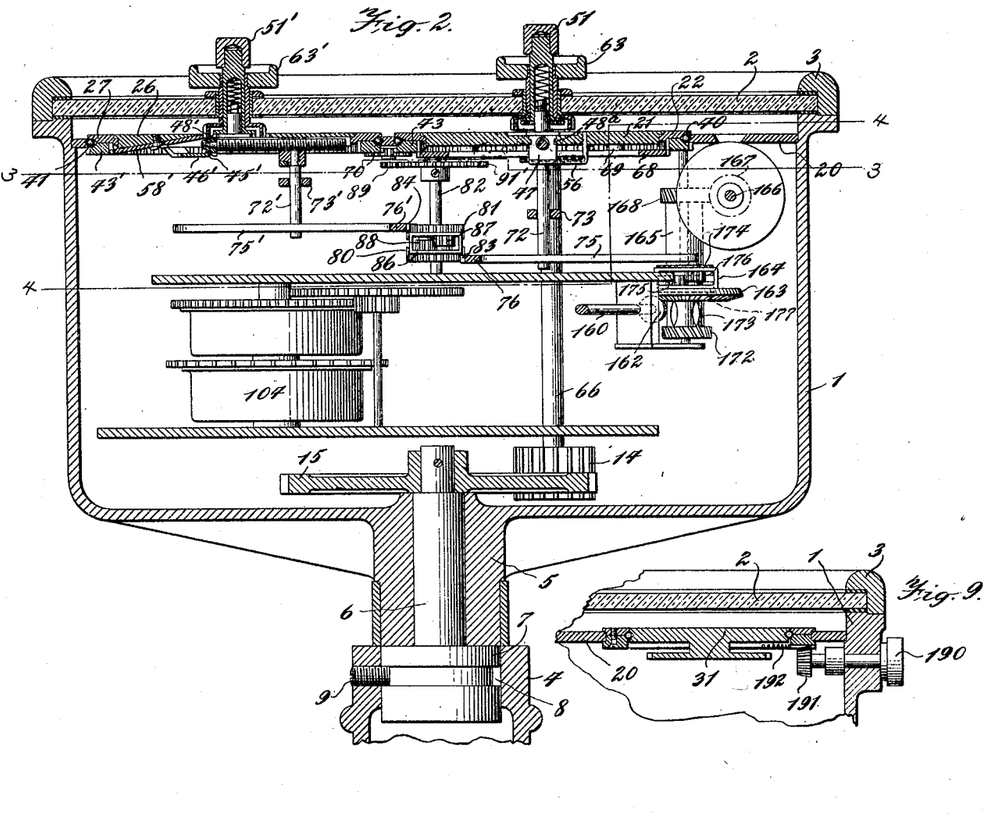
Fig. 2 is a central vertical section through the instrument.
Fig. 9 is a detail of the deflection correction ring.

In Fig. 9 of the drawing, a detail is shown of the correction ring which surrounds the deflection dial. The purpose of this ring is to add any ballistic correction for wind, etc., as is the usual custom. The correction is added by moving the ring with respect to a fixed zero by means of a knob 190 projecting from the side wall of the casing. This knob is secured to a shaft passing through a suitable bearing in the casing and carrying a bevel gear 191 at its inner end which bevel gear meshes with an annular rack 192 formed upon the bottom face of the correcting ring.

In mounting the instrument for use upon the "ship," the pedestal is first securely fastened to the deck. The set screws 9 are then loosened and by turning the handwheel 10 the pointer 23 on the "ship" dial is rotated until the lubber-line reads zero on the inside circle of the "ship" dial. The entire case is then oriented in the pedestal until the sight lubber-line and pointer 23 on the "ship" dial are alined parallel to the fore and aft center line of the ship. The set screws 9 are then tightened and the instrument is ready for use.

It is evident in the preceding description that when the case of the instrument is thereafter oriented by means of the handwheel 10, the pointer 23 remains parallel to the fore and aft center line of the ship, as has been previously described, which is essential for the correct usage of the instrument. Any changes in course of the "ship" are set up upon the instrument by depressing the knob 63 which, as described, will rotate the two compass rings 22 and 27 so that their zero points remain north. The speed of the "ship" is set up upon the speed scale on the "ship" dial, as described. Care should be exercised to keep these factors always set, in accordance with the course and speed of the "ship" for accurate use of the instrument. The "target" course is set up by pressing knob 63', which, as described, rotates the "target" course dial 26, and the "target" dial is then rotated until the ship pointer 30 reads the true course of the "target" upon the outside compass ring 27. As is obvious to one skilled in the use of these instruments, the course of the "target" is obtained from such information as is available upon board ship. The speed of the "target," which is estimated in the same way, is set up upon the "target" speed scale, as described. The estimated range is also set up upon the range counter by means of the crank 170 and if the course and speed of the "target" have been correctly estimated by maintaining the sight vane trained upon the "target," the range rate, deflection rate and the generated range will be reproduced automatically and correctly by the instrument, and may be utilized in the training of the guns. It is to be noted that the two ship pointers 23 and 30 always remain in correct positions both relative to each other and relative to their true courses. This is of advantage since the dials and pointers upon the instrument will then give to the operator a clear conception of the problem requiring the guns upon the vessel to be trained upon a "target." This representation of the actual problem presented by two moving objects to determine the range and deflection is made possible by separately and independently setting up the course and speed of the "ship" and "target" and then by adding the components of the vectors representing the course of speed of the "ship" and "target" along the line of sight and the line normal thereto, and in so far as I am aware, this feature in instruments of this character is broadly new with me, and it is not my intention to limit the same to the specific embodiment of the invention shown but only by the scope of the claims appended hereto.

I claim:

1. In an instrument of the class described, a mechanical vector, means for setting said vector corresponding to a ship's bearing relative to the line of sight and speed, a second mechanical vector, means for setting said vector corresponding to a target's bearing relative to the line of sight and speed, means associated with said vectors for indicating the true course of said ship, a part connected to said first vector having a displacement proportional to the component of said first vector along the line of sight, a part connected to said second vector having a displacement proportional to the component of said second vector along the line of sight, and means for adding such components together.

2. In an instrument of the class described, a mechanical vector, means for setting said vector corresponding to a ship's bearing relative to the line of sight and speed, a second mechanical vector, means for setting said vector corresponding to a target's bearing relative to the line of sight, means for indicating the true courses of said ships and speed, a part connected to said first vector having a displacement proportional to the component of said first vector along a line normal to the line of sight, a part connected to said second vector having a displacement proportional to the component of said second vector along a line normal to the line of sight, and means for adding said components together.

3. In an instrument of the class described, a rotary mechanical vector, means for setting said vector corresponding to a ship's bearing relative to the line of sight and speed, a second rotary mechanical vector, means for setting said vector corresponding to a target's bearing relative to the line of sight and speed, two parts connected to each of said vectors, one part being displaceable along a line parallel to the line of sight and the other part along a line normal to the line of sight, means for rotating said vectors relative to the line of sight, means for adding the displacement of said parts movable along the line of sight, and means for adding the displacement of said parts movable along a line normal to the line of sight.

4. In an instrument of the class described, a rotary mechanical vector, means for setting said vector corresponding to a ship's bearing relative to the line of sight and speed, a second rotary mechanical vector, means for setting said vector corresponding to a target's bearing relative to the line of sight and speed, two movable parts connected to each of said vectors, one of said parts being displaceable along a line parallel to the line of sight and the other of said parts being displaceable along a line normal to the line of sight, means for rotating said vectors relative to the line of sight, mechanism jointly actuable by the two parts moving parallel to the line of sight, and indicating means associated with said mechanism, other mechanism jointly actuable by said parts moving normal to the line of sight and indicating means associated with said last named mechanism.

5. In an instrument of the class described, a rotary mechanical vector, means for setting said vector corresponding to a ship's bearing relative to the line of sight and speed, a second rotary mechanical vector, means for setting said vector corresponding to a target's bearing relative to the line of sight and speed, a part associated with each of said vectors movable along a line parallel to the line of sight, means for rotating said vectors relative to the line of sight to displace said parts, and mechanism associated with said parts and actuated by the joint displacement of said parts.

6. In an instrument of the class described, a rotary mechanical vector, means for setting said vector corresponding to a ship's bearing relative to the line of sight and speed, a second rotary mechanical vector, means for setting said vector corresponding to a target's bearing relative to the line of sight and speed, a part associated with each of said vectors movable along a line normal to the line of sight, means for rotating said vectors relative to the line of sight to displace said parts, and mechanism associated with said parts and actuated by the joint displacement of said parts.

7. In an instrument of the class described, a rotatable member carrying a linearly movable part, a second rotatable member carrying a linearly movable part, a pair of cross slides associated with each of said parts having corresponding slides of each pair arranged in parallel relation, and means adding the displacements of each pair of parallel slides upon relative rotation of said members and slides.

8. In an instrument of the class described, a rotatable member carrying a linearly movable part, a second rotatable member carrying a linearly movable part, a slide connected to each of said parts, said slides being disposed in parallel relation whereby on rotation of one or both of said members relative to said slides, said slides will be displaced, and means common to said slides and actuated thereby having a displacement proportional to the sum of the displacements of said slides.

9. In an instrument of the class described, a rotatable member carrying a linearly movable part, a second rotatable member carrying a linearly movable part, a pair of cross slides associated with each of said parts, said cross slides having their corresponding slides disposed in parallel relation, racks movable with each of said cross slides, a rotary shaft and differential gearing connecting each pair of parallel racks to said rotary shaft.

10. In an instrument of the class described, a rotatable member carrying a linearly movable part, a second rotatable member carrying a linearly movable part, a slide connected to each of said parts, said slides being disposed in parallel relation, a rack movable with each slide, a rotary shaft and differential gearing interposed between said racks and said rotary shaft.

11. In an instrument of the class described, a part movable proportionately to a range rate, a member adapted to be driven at a constant speed, a range counter, a member for driving said range counter, a pair of balls in rolling contact with each other and said members respectively, a cage surrounding said balls, and a connection between said cage and said part.

12. In an instrument of the class described, a part movable proportionately to the range rate, a disk adapted to be driven at a constant speed, a roller, a pair of balls in rolling contact with each other and with the roller and disk respectively, a cage surrounding said balls, a connection between said cage and said movable part, and a range counter driven by said roller.

13. In an instrument of the class described, a pair of parallel slides movable in the same or in opposite directions, racks carried by said slides, a rotary shaft, gears loosely mounted on said shaft meshing with said racks, a part fastened to said shaft, and pinions carried by said part meshing with said gears.

14. In an instrument of the class described, a range indicator, variable speed mechanism for actuating said range indicator, manually operable mechanism for actuating said indicator, each of said mechanisms having a permanent connection with said mechanisms.

15. In an instrument of the class described, a range indicator, variable speed mechanism for actuating said indicator, manually operable mechanisms for actuating said indicator, and a differential gearing interposed between said indicator and both of said mechanisms.

16. In an instrument of the class described, an indicator, means for automatically actuating said indicator, means for manually actuating said indicator, and differential gearing for connecting both of said means to said indicator.

17. In an instrument of the class described, a pair of dials, rings surrounding each of said dials, gearing connecting said rings, an internal gear on each of said rings, a pinion carried by each of said dials meshing with said internal gear and normally locked against rotation, manually operable means for releasing each of said pinions and for rotating it, a driving connection to one of said dials, a sliding block carried by each of said dials, slides coöperating with said blocks, and an indicator actuated by the joint movement of said slides.

18. In an instrument of the class described, a pair of dials, rings surrounding said dials, gearing connecting said rings, an internal gear on each ring, a pinion carried by each dial meshing with the internal gear on said ring, manually operable means for rotating said pinion, a revoluble casing for said parts, means for revolving said casing and one of said dials, a sliding block carried by each of said dials, slides coöperating with said blocks, and an indicator actuated by the joint movement of said slides.

19. In an instrument of the class described, a rotary "target" pointer, a rotary "ship" pointer, means for setting said pointers to the true course of a target and ship, respectively, and indicating means for giving the true and relative bearing of the target from the ship.

20. In an instrument of the class described, a rotary "target" pointer, a rotary "ship" pointer, and a pair of scales reading in degrees associated with each of said dials for giving direct readings of the true and relative courses of the ship and target and the true and relative bearings of the ship and the target with respect to each other.

21. In an instrument of the class described, a rotary "ship" pointer and a rotary "target" pointer, two scales reading in degrees associated with each of said pointers, and a lubber's line parallel to the line of sight coöperating with said scales.

22. In an instrument of the class described, a rotary "ship" pointer and a rotary "target" pointer, a compass ring surrounding each of said pointers movable independently of said pointers, a scale graduated in degrees rotatable with each pointer, and a lubber's line coöperating with said compass rings and said scales.

23. In an instrument of the class described, a revoluble casing having a fixed line thereon, two mechanical vectors carried by said casing extending from said fixed line, means for rotating said casing to maintain said fixed line parallel to the line of sight, means for rotating said vectors to successive parallel positions upon rotation of said casing, means for deriving the components of said vectors along the line of sight, and means for adding said components together.

24. In an instrument of the class described, a revoluble casing having a fixed line thereon, two mechanical vectors carried by said casing extending from said fixed line, means for rotating said casing to maintain said fixed line parallel to the line of sight, means for rotating said vectors to successive parallel positions upon rotation of said casing, means for deriving the components of said vectors along the line normal to the line of sight, and means for adding said components together.

25. In an instrument of the class described, a revoluble casing having a fixed line thereon, two mechanical vectors carried by said casing extending from said fixed line, means for rotating said casing to maintain said fixed line parallel to the line of sight, means for rotating said vectors to successive parallel positions upon rotation of said casing, a slide associated with each vector mounted for rotation with said casing, and mechanism associated with said slides movable in accordance with the combined displacement of said slides.

In witness whereof I subscribe my signature.

HANNIBAL C. FORD.